United States Patent [19]
Takeuchi et al.

[11] Patent Number: 4,865,398
[45] Date of Patent: Sep. 12, 1989

[54] ACTUATOR FOR WHEEL ANTI-LOCK SYSTEM

[75] Inventors: Hiroaki Takeuchi; Noboru Noguchi; Nobuyasu Nakanishi, all of Toyota, Japan

[73] Assignees: Aisin Seiki Kabushiki Kaisha, Kariya, Japan; Toyota Jidosha Kabushiki Kaisha, Toyota, Japan

[21] Appl. No.: 198,240

[22] Filed: May 25, 1988

[30] Foreign Application Priority Data

May 29, 1987 [JP] Japan .................. 62-136956

[51] Int. Cl.⁴ .............. B60T 8/42; B60T 8/36; B60T 8/44; F15B 7/08
[52] U.S. Cl. .................. 303/115; 303/119; 303/114; 60/579; 60/591
[58] Field of Search .................. 303/6.01, 50, 84.2, 303/113, 114, 115, 117, 119; 188/358, 359, 360, 181 A; 60/565, 574, 579, 591

[56] References Cited

U.S. PATENT DOCUMENTS

| | | |
|---|---|---|
| 3,521,934 | 7/1970 | Leiber . |
| 3,738,712 | 6/1973 | Flory .................... 303/114 |
| 4,129,341 | 12/1978 | Pauwels .................. 303/119 X |
| 4,492,414 | 1/1985 | Kozakai et al. . |
| 4,552,413 | 11/1985 | Fujii et al. . |
| 4,597,611 | 7/1986 | Nishimura et al. . |
| 4,602,824 | 7/1986 | Nishimura et al. . |
| 4,605,263 | 8/1986 | Ando et al. . |
| 4,618,189 | 10/1986 | Nakanishi et al. . |
| 4,624,508 | 11/1986 | Adachi et al. . |
| 4,636,008 | 1/1987 | Adachi et al. . |
| 4,636,010 | 1/1987 | Adachi et al. . |
| 4,655,509 | 4/1987 | Ando et al. . |
| 4,660,899 | 4/1987 | Ando et al. . |
| 4,725,103 | 2/1988 | Watanabe ................. 303/119 X |
| 4,800,289 | 1/1989 | Adachi et al. ............. 303/119 |

FOREIGN PATENT DOCUMENTS

| | | |
|---|---|---|
| 1924046 | 11/1970 | Fed. Rep. of Germany ...... 303/113 |
| 2363619 | 8/1974 | Fed. Rep. of Germany . |
| 2519835 | 7/1976 | Fed. Rep. of Germany . |
| 3203563 | 8/1983 | Fed. Rep. of Germany ...... 303/119 |
| 3702682 | 6/1988 | Fed. Rep. of Germany ...... 303/115 |
| 49-28307 | 6/1974 | Japan . |
| 56-142733 | 1/1981 | Japan . |
| 58-199258 | 4/1983 | Japan . |
| 0033160 | 2/1985 | Japan .................... 303/119 |
| 60-25834 | 5/1985 | Japan . |
| 60-25835 | 11/1985 | Japan . |
| 61-222850 | 11/1986 | Japan . |
| 62-187638 | 1/1987 | Japan . |
| 62-191260 | 1/1987 | Japan . |
| 62-187640 | 7/1987 | Japan . |
| 1402690 | 8/1975 | United Kingdom ........ 303/114 |
| 2084275 | 4/1982 | United Kingdom ........ 303/119 |
| 2141195A | 3/1984 | United Kingdom . |
| 2175362A | 3/1986 | United Kingdom . |
| 2168771A | 4/1986 | United Kingdom . |
| 2174161 | 10/1986 | United Kingdom ........ 303/114 |

Primary Examiner—Andres Kashnikow
Assistant Examiner—Timothy Newholm
Attorney, Agent, or Firm—Burns, Doane, Swecker & Mathis

[57] ABSTRACT

An actuator for a wheel anti-lock system, which comprises a first conduit connected to a brake master cylinder and a second conduit connected to a brake wheel cylinder. To the second conduit, there is connected a reservoir for reserving a predetermined amount of working liquid. Between the first conduit and the second conduit, there is interposed a feed change-over valve for opening or closing the communication between them. Between the second conduit and the reservoir, there is interposed a release change-over valve for opening or closing the communication between them. In the first conduit, there is disposed a normally open cut valve for closing the first conduit when in a skid control. To the first conduit, there is connected a pressure transducer in parallel with the cut valve. The pressure transducer includes: a body having a smaller bore connected to the brake master cylinder and a larger bore connected to the brake wheel cylinder; a stepped piston fitted in the two bores; and a spring for biasing the stepped piston toward the smaller portion thereof. When in the skid control, the pressure transducer feeds the second conduit with a pressure liquid, a predetermined amount larger than the pressure liquid which is fed from the master cylinder, to the pressure transducer.

8 Claims, 2 Drawing Sheets

ACTUATOR FOR WHEEL ANTI-LOCK SYSTEM

FIELD OF THE INVENTION

The present invention relates to an actuator for a vehicular wheel anti-lock system or the so-called "anti-skid system" and, more particularly, to an inexpensive actuator of manual type having no auxiliary power source so that it is used for skid prevention of rear wheels of a vehicle such as a small-sized truck.

DESCRIPTION OF THE RELATED ART

The actuator of this kind has been proposed in Japanese Patent Laid-Open No. 61-222850, for example. This actuator prevents the wheel from locking and skidding by feeding a pressure liquid from a brake master cylinder directly to a brakewheel cylinder or releasing it to a reservoir when in a skid control, i.e., when a wheel cylinder pressure is to be increased or decreased.

These operations raise the following problems in the aforementioned actuator:

(1) In the skid control, the working liquid in an amount substantially equal to that of the working liquid released to the reservoir after having been fed from the brake wheel cylinder is fed from the brake master cylinder to the brake wheel cylinder. This obliges the brake pedal to be depressed by a stroke corresponding to the feed amount so that the pedal depression has a bad feel.

(2) The amount of pressure liquid to be used for the skid control, i.e., the maximum feed amount of pressure liquid to the brake wheel cylinder is determined by the internal diameter of the brake master cylinder and the maximum stroke of the brake pedal. In order to augment the maximum feed amount, it is necessary to augment the internal diameter of the master cylinder and the maximum stroke of the brake pedal. As a result, the brake booster has to be sized up to seriously raise the production cost.

SUMMARY OF THE INVENTION

An object of the present invention is to provide an actuator in which the stroke of the brake pedal when in a skid control is smaller than that of the actuator of the related art while improving the pedal operating feel.

Another object of the present invention is to provide an actuator in which the booster need not be sized up so as to augment the amount of pressure liquid to be used for the skid control so that the rise in the production cost can be minimized.

In order to achieve the above-specified objects, according to the present invention, there is provided an actuator for a wheel anti-lock system, comprising: a first conduit connected to a brake master cylinder; a second conduit connected to a brake wheel cylinder; a reservoir connected to said second conduit for reserving a predetermined amount of working liquid; a control valve for controllably opening or closing the communication between said first conduit and said second conduit and the communication between said second conduit and said reservoir; a normally open cut valve disposed in said first conduit for closing the same when in a skid control; and a pressure transducer connected in parallel with said cut valve and including a stepped piston having a smaller portion disposed at the side of said brake master cylinder and a larger portion disposed at the side of said brake wheel cylinder; and bias means for biasing said stepped piston toward said smaller portion.

Other objects of the present invention will become apparent if the modes of embodiments to be described are understood, as will be clarified in the appended claims. Many advantages left untouched will be thought to those skilled in the art if the present invention is put into practice.

DESCRIPTION OF THE PREFERRED EMBODIMENTS

Figure 1:
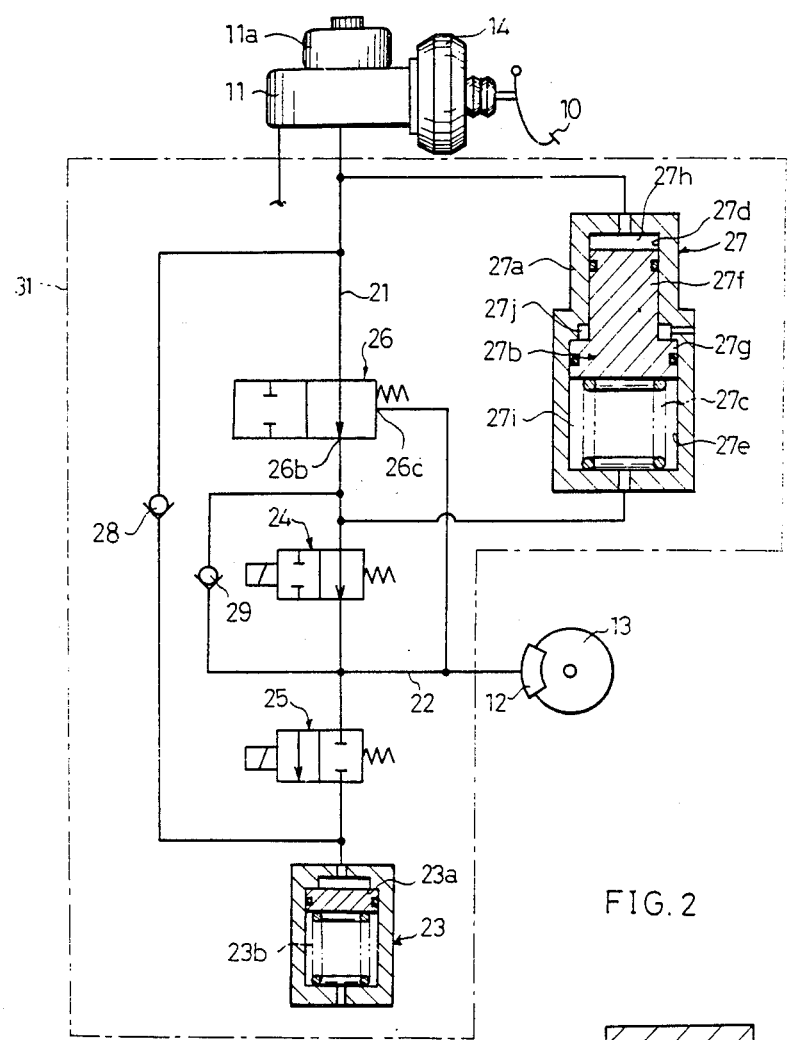
FIG. 1 is a schematic diagram showing the structure of one embodiment of the present invention.
Figure 2:
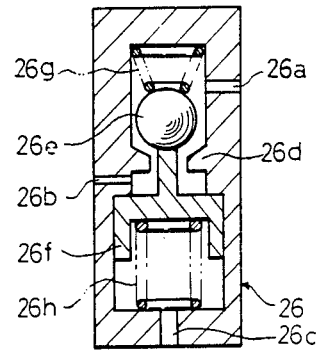
FIG. 2 is an enlarged section showing a normally open cut valve shown in FIG. 1.

In a vehicular brake system, as shown in FIGS. 1 and 2, a brake master cylinder 11 is actuated by a brake pedal 10 through a booster 14. The brake master cylinder 11 is connected through liquid pressure conduits to a brake wheel cylinder 12. The liquid pressure to be applied from the master cylinder 11 to the wheel cylinder 12 is controlled by an actuator 31 according to the present embodiment.

The actuator 31 is constructed of: a first conduit 21 connected to the master cylinder 11; a second conduit 22 connected to the wheel cylinder 12; a reservoir 23 connected to the second conduit 22 for reserving a predetermined amount of working liquid; a feed change-over valve 24; a release change-over valve 25; a cut valve 26; and a pressure transducer 27. The reservoir 23 is composed of a piston 23a and a spring 23b for biasing the piston 23a in a direction to release the working liquid in the reservoir 23. This reservoir 23 is enabled to reserve the working liquid recirculated through the release change-over valve 25 and to recirculate the working liquid reserved to the first conduit 21 through a check valve 28 when the brake is to be released.

The feed change-over valve 24 is a two-port, two-position electromagnetic opening or closing valve interposed between the first conduit 21 and the second conduit 22. The feed change-over valve 24 provides, when demagnetized, the communication between the first conduit 21 connected to the master cylinder 11 and the second conduit 22 connected to the wheel cylinder 12 and blocks, when magnetized, the communication between the first conduit 21 and the second conduit 22. The release change-over valve 25 is a two-port, two-position electromagnetic opening or closing valve interposed between the second conduit 22 and the reservoir 23. The release change-over valve 25 blocks the communication between the second conduit 22 and the reservoir 23, when demagnetized, and provides the connection between the second conduit 22 and the reservoir 23 when magnetized. The change-over operations of those two change-over valves 24 and 25 are controlled by a not-shown electric control device. When in the skid control, the demagnetizations and magnetizations of the two change-over valves 24 and 25 are repeated in accordance with the locking state of a wheel 13. Incidentally, in the present embodiment, there is disposed in parallel with the feed change-over valve 24 a check valve 29 for smoothly recirculating the pressure liquid in the second conduit 22 to the first conduit 21 when the brake is released.

The cut valve 26 is a normally open cut valve disposed in the first conduit 21. Using the master cylinder pressure to be fed via the first conduit 21 and the wheel cylinder pressure to be fed via the second conduit 22 as pilot pressures, the cut valve 26 operates to close the first conduit 21 when the difference between the master cylinder pressure and the wheel cylinder pressure exceeds a predetermined value. As shown in FIGS. 1 and 2, the cut valve 26 is formed with: an inlet port 26a connected to the master cylinder 11 via the first conduit 21; an outlet port 26b connected to the wheel cylinder 12 through the feed change-over valve 24; and a pilot port 26c connected to the second conduit 22 in a manner to by pass the feed change-over valve 24. The cut valve 26 is composed of: a valve seat 26d formed therein; a ball valve member 26e disposed at the side of the inlet port 26a relative to the valve seat 26d; a piston 26f disposed at the side of the pilot port 26c relative to the valve seat 26d and supporting to the ball valve member 26e; and a pair of springs 26g and 26h acting as bias means for biasing the ball valve member 26e and the piston 26f in a direction to face and contact each other. The valve seat 26d, the ball valve member 26e, the piston 26f, and the springs 26g and 26h constitute together opening or closing means for opening or closing the first conduit 21. In the cut valve 26 thus constructed, the ball valve member 26e and the piston 26f are held in the state shown in FIG. 2 by the actions of the springs 26g and 26h to open the first conduit 21 when the difference between the master cylinder pressure fed via the inlet port 26a and the wheel cylinder pressure fed via the pilot port 26c is lower than a predetermined value. When the above-specified pressure difference exceeds the predetermined value, that is to say, when the master cylinder pressure is higher than the wheel cylinder pressure by the predetermined value or more, the piston 26f is moved apart from the valve seat 26d against the biasing force of the spring 26h so that the ball valve member 26e is seated on the valve seat 26d to close the first conduit 21.

The pressure transducer 27 is connected to the first conduit 21 in parallel with the cut valve 26. The pressure transducer 27 is composed of a body 27a, a stepped piston 27b and a spring 27c. The body 27a defines both smaller bore 27d connected to the master cylinder and a larger bore 27e connected to the wheel cylinder. The stepped piston 27b has its smaller portion 27f and larger portion 27g fitted in the smaller bore 27d and larger bore 27e of the body 27a, respectively, such that they can reciprocate in the bores 27d and 27e. The stepped piston 27b is biased toward the smaller portion 27f by the spring 27c disposed at the side of the larger portion 27g and acting as bias means. The bores 27d and 27e define first and second liquid chambers 27h and 27i, respectively, at the sides of the smaller portion 27f and the larger portion 27g. Between the step of the stepped piston 27b and the step of the body 27a, there is formed an air chamber 27j which has communication with the outside of the body 27a. The pressure transducer 27 has its stepped piston 27b moved toward the larger portion 27g against the biasing force of the spring 27c to feed an increased amount of pressure liquid to the feed change-over valve 24, in case it is fed with the pressure liquid from the master cylinder 11 while the cut valve 26 is being closed.

In the actuator 31 thus constructed according to the present embodiment, when in an ordinary braking operation, the feed change-over valve 24 provides the communication between the first conduit 21 and the second conduit 22 but the release change-over valve 25 blocks the communication between the second conduit 22 and the reservoir 23, so that the normally open cut valve 26 opens the first conduit 21. As a result, the pressure liquid in the master cylinder 11 is fed through the normally open cut valve 26 and the feed change-over valve 24 to the wheel cylinder 12 to brake the wheel 13. At this time, the pressure transducer 27 is held in the state shown in FIG. 1.

When in a skid control, on the other hand, the feed change-over valve 24 blocks the communication between the first conduit 21 and the second conduit 22, but the release change-over valve 25 provides the communication between the second conduit 22 and the reservoir 23. In this first operation, the liquid pressure in the second conduit 22 drops to establish a pressure difference exceeding a predetermined value between the liquid pressures in the first conduit 21 and the second conduit 22 so that the normally open cut valve 26 closes the first conduit 21. In this state, the following operations are repeated in accordance with the locking state of the wheel 13 when the vehicle is braked, so that the wheel 13 is optimumly prevented from locking: (a) the operation, in which the feed change-over valve 24 blocks the communication between the first conduit 21 and the second conduit 22 whereas the release change-over valve 25 provides the communication between the second conduit 22 and the reservoir 23 so that the pressure liquid in the second conduit 22 is released through the release change-over valve 25 to the reservoir 23 to drop the liquid pressure in the second conduit 22 and the wheel braking force accordingly; and (b) the operation, in which the feed change-over valve 24 provides the communication between the first conduit 21 and the second conduit 22 whereas the release change-over valve 25 blocks the communication between the second conduit 22 and the reservoir 23 so that the pressure liquid is fed from the pressure transducer 27 to the second conduit 22 to augment the wheel braking force.

In the actuator 31 of the present embodiment, moreover, the pressure liquid is fed from the pressure transducer 27 to the second conduit 22 when in the skid control. Since the second liquid chamber 27i of the pressure transducer 27 connected to the wheel cylinder 12 has a larger diameter than that of the first liquid chamber 27h connected to the master cylinder 11, the pressure transducer 27 feeds the second conduit 22 with a pressure liquid, a predetermined amount larger than that fed from the master cylinder 11, to the pressure transducer 27. In other words, the amount of liquid fed from the master cylinder to the pressure transducer 27 is less than that fed from the pressure transducer 27 via the second conduit 22 to the wheel cylinder 12. As a result, the amount of stroke of the brake pedal in the skid control is dropped to a lower value than that of the actuator of the related art so that the pedal operation can have an improved feel.

In the actuator 31, as described above, the normally open cut valve 26 and the pressure transducer 27 are combined to augment the amount of liquid to be used when in the skid control without sizing up the master cylinder 11. As a result, the rise in the production cost can be minimized without any requirement for the size-up of the booster 14.

Incidentally, in the embodiment thus far described, the cut valve 26 adopted as the normally open cut valve disposed in the first conduit 21 is of hydraulic type. However, the present invention can be exemplified by an electromagnetic type normally open cut valve 126 which is adapted to be magnetized for closing the first conduit 21 when in the skid control, as shown in FIG. 3.

Figure 3:
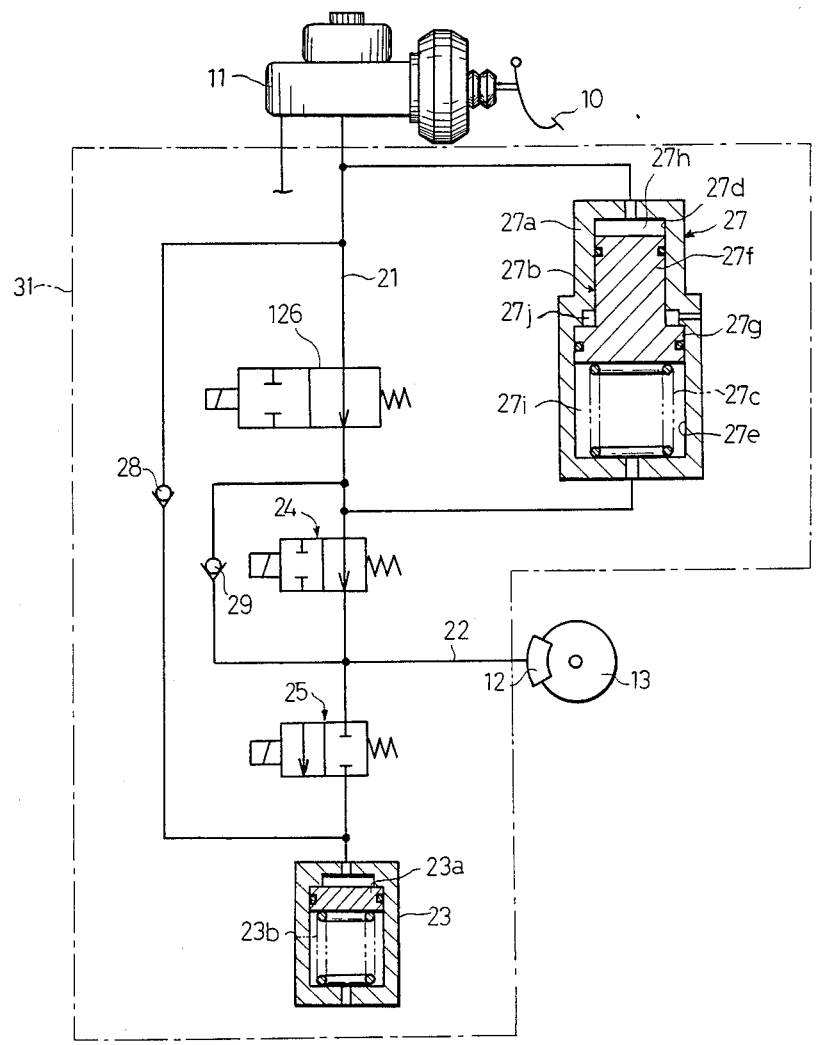
FIG. 3 is a schematic diagram showing the structure of a modification of the present invention.

In the two embodiments shown in FIGS. 1 and 3, on the other hand, the liquid pressure in the second conduit 22 is controlled by the feed change-over valve 24 and the release change-over valve 25 when in the skid control. However, the present invention can be practiced by adopting a three-port, two position electromagnetic change-over valve or a three-port, three-position electromagnetic change-over valve in place of the two change-over valves 24 and 25. In a first position of the three-port, two-position electromagnetic change-over valve, more specifically, the communication between the first conduit 21 and the second conduit 22 is provided whereas the communication between the second conduit 22 and the reservoir 23 is blocked. In a second position, the communication between the first conduit 21 and the second conduit 22 is blocked whereas the communication between the second conduit 22 and the reservoir 23 is provided. In a first position of the three-port, three-position electromagnetic change-over valve, the communication between the first conduit 21 and the second conduit 22 is provided whereas the communication between the second conduit 22 and the reservoir 23 is blocked. In a second position, the communication between the first conduit 21 and the second conduit 22 is blocked whereas the communication between the second conduit 22 and the reservoir 23 is provided. In a third position, the communication between the first conduit 21 and the second conduit 22 is blocked whereas the second conduit 22 and the reservoir 23 is blocked.

It is also possible to dispose a two-speed change-over valve in the second conduit 22 thereby to control the inflow and outflow rates of the pressure liquid into or out of the wheel cylinder 12. In the aforementioned two embodiments, on the other hand, the present invention has been practiced by providing the reservoir 23 separately of the reservoir 11a of the master cylinder 11. However, the present invention can be practiced by connecting the release change-over valve 25 to the reservoir 11a of the master cylinder 11.

It is now apparent that widely different modes of embodiments can be constructed without departing from the spirit and scope of the present invention. Therefore, the present invention should not be limited to other than the specified modes of embodiments defined in the accompanying claims.

What is claimed is:

1. An actuator for a wheel anti-lock system, comprising:
    a first conduit connected to a brake master cylinder;
    a second conduit connected to a brake wheel cylinder;
    a reservoir connected to said second conduit for reserving a predetermined amount of working liquid;
    a control valve opening or closing a communication between said first conduit and said second conduit and a communication between said second conduit and said reservoir;
    a normally open cut valve disposed in said first conduit for closing the same during a skid control operation; and
    a pressure transducer connected to said first conduit to bypass said cut valve when said cut valve is being closed and including a stepped piston having a smaller portion communicating with said brake master cylinder and a larger portion communicating with said brake wheel cylinder and said cut valve, and bias means for biasing said stepped piston toward said smaller portion.

2. An actuator according to claim 1, wherein said normally open cut valve includes: an inlet port connected to said brake master cylinder; an outlet port connected to said brake wheel cylinder through said control valve; a pilot port connected to said brake wheel cylinder in a manner to bypass said control valve; and opening or closing means operated during the skid control operation, if a pressure difference between a master cylinder pressure fed through said inlet port and a wheel cylinder pressure fed through said pilot port is equal to or higher than a predetermined value, for closing said first conduit.

3. An actuator according to claim 2, wherein said opening or closing means includes: a valve seat disposed in said cut valve; a ball valve member disposed at a side of said inlet port relative to said valve seat; a piston disposed at a side of said pilot port relative to said valve seat and supporting said ball valve member; and bias means for biasing said ball valve member and said piston in a direction to face and contact each other.

4. An actuator according to claim 1, wherein said normally open cut valve, is an electromagnetic type normally open cut valve adapted to be magnetized during the skid control operation for closing said first conduit.

5. An actuator according to claim 1, wherein said pressure transducer further includes a body having a smaller bore fitting said smaller portion of said stepped piston and a larger bore fitting said larger portion of said stepped piston, said smaller bore being connected to said brake master cylinder whereas said larger bore being connected to said brake wheel cylinder.

6. An actuator according to claim 5, wherein said pressure transducer further includes an air chamber formed between a step of said stepped piston and a step of said body and having communication with an outside of said body.

7. An actuator according to claim 1, wherein said control valve includes: a first electromagnetic opening or closing valve interposed between said first conduit and said second conduit for providing the communication between said first conduit and said second conduit when demagnetized and for blocking the communication between said first conduit and said second conduit when magnetized; and a second electromagnetic opening or closing valve interposed between said second conduit and said reservoir for blocking the communication between said second conduit and said reservoir when demagnetized and for providing the communication between said second conduit and said reservoir when magnetized.

8. An actuator for a wheel anti-lock system, comprising:
    a first conduit connected to a brake master cylinder;
    a second conduit connected to a brake wheel cylinder;

a reservoir connected to said second conduit for reserving a predetermined amount of working liquid;

a first check valve for recirculating the working liquid in said reservoir to said first conduit when a brake is released;

a first electromagnetic opening or closing valve interposed between said first conduit and said second conduit for providing a communication between said first conduit and said second conduit when demagnetized and for blocking a communication between said first conduit and said second conduit when magnetized;

a second electromagnetic opening or closing valve interposed between said second conduit and said reservoir for blocking a communication between said second conduit and said reservoir when demagnetized and for providing a communication between said second conduit and said reservoir when magnetized;

a second check valve connected in parallel with said first electromagnetic opening or closing valve for recirculating the working liquid in said second conduit to said first conduit when the brake is released;

a normally open cut valve disposed in said first conduit for closing said first conduit when in a skid control; and a pressure transducer connected to said first conduit to bypass said cut valve and including a body having a first bore connected to said brake master cylinder and a second bore connected to said brake wheel cylinder and having a larger diameter than that of said first bore, a piston having a first portion fitted in said first bore of said body and a second portion fitted in said second bore and having a larger diameter than that of said first portion; and bias means for biasing said piston toward said first portion.

* * * * *